United States Patent
Hukuhara et al.

(10) Patent No.: US 7,011,720 B2
(45) Date of Patent: Mar. 14, 2006

(54) DOUBLE-TAPER STEEL WIRE AND CONTINUOUS HEAT TREATING METHOD AND DEVICE THEREFOR

(75) Inventors: Tetsukazu Hukuhara, Kanagawa (JP); Fumiaki Ikuta, Kanagawa (JP)

(73) Assignee: Neturen Co., Ltd., Tokyo (JP)

( * ) Notice: Subject to any disclaimer, the term of this patent is extended or adjusted under 35 U.S.C. 154(b) by 263 days.

(21) Appl. No.: 10/070,534

(22) PCT Filed: Oct. 24, 2001

(86) PCT No.: PCT/JP01/09312

§ 371 (c)(1),
(2), (4) Date: Mar. 31, 2003

(87) PCT Pub. No.: WO02/38817

PCT Pub. Date: May 16, 2002

(65) Prior Publication Data

US 2004/0103961 A1    Jun. 3, 2004

(30) Foreign Application Priority Data

Nov. 10, 2000   (JP)   .............................. 2000-342868

(51) Int. Cl.
  *C22C 38/00*   (2006.01)
  *C21D 9/52*    (2006.01)
(52) U.S. Cl. ...................... 148/320; 148/595; 148/576; 148/511
(58) Field of Classification Search ................ 148/568, 148/595, 576, 511, 510, 320; 72/240, 200; 219/636, 601; 266/129, 87, 78
See application file for complete search history.

(56) References Cited

U.S. PATENT DOCUMENTS

| 4,842,818 A | * | 6/1989 | Kato et al. .................. 420/100 |
| 6,035,686 A | | 3/2000 | Muhr et al. |

FOREIGN PATENT DOCUMENTS

| JP | 57-70043 A | 4/1982 |
| JP | 61-35556 Y2 | 10/1986 |
| JP | 3-37989 A | 2/1991 |

(Continued)

OTHER PUBLICATIONS

English abstract of Japanese patent 360056417, Sato, Kazuo et al., Apr. 2, 1985.*

*Primary Examiner*—Deborah Yee
(74) *Attorney, Agent, or Firm*—Sughrue Mion, PLLC

(57) ABSTRACT

A double tapered steel wire (S) is evenly heat treated over the entire length thereof. The wire (S) has its constant-diameter straight portion (21, 24) disposed between its opposite end tapered portions (22, 23) each tapered down to its reduced-diameter outer end. In heat treatments, a diameter of the wire (S) is continuously detected by a detection means (3, 6), so that the amount of energy of induction heating applied to the wire (S) is controlled by a control unit (12) in a manner such that the amount of the energy is proportional to a wire diameter of the wire (S) having been detected, whereby heat applied to the wire (S) varies over the entire length of the wire (S). As a result, the wire (S) is quenched and tempered over its entire length in a manner such that the wire (S) thus heat treated has its small-diameter portions (24) and its large-diameter portion (21) differ from each other in tensile strength.

2 Claims, 5 Drawing Sheets

FOREIGN PATENT DOCUMENTS

| | | |
|---|---|---|
| JP | 3-189036 A | 8/1991 |
| JP | 2001-347301 | 12/2001 |
| JP | 2002-282982 | * 10/2002 |
| JP | 2002-285231 | * 10/2002 |

* cited by examiner

Fig.8

| Material | Dimensions (mm) | | | | | |
| --- | --- | --- | --- | --- | --- | --- |
| | $d_1$ | $d_2$ | $L_1$ | $L_{12}$ | $L_2$ | $L_0$ |
| SAE9254 | 12.5 | 16.0 | 800 | 220 | 900 | 2140 |

DOUBLE-TAPER STEEL WIRE AND CONTINUOUS HEAT TREATING METHOD AND DEVICE THEREFOR

FIELD OF THE INVENTION

The present invention relates to a double tapered steel wire and a method and an apparatus for continuously heat treating the wire, wherein the wire is provided with a straight central portion with a constant diameter; and, opposite tapered end portions disposed adjacent to opposite ends of the straight central portion, the tapered end portions being tapered down to their reduced-diameter outer ends. The wire is used as material for coil springs, and wound in a manner such that the coil spring assumes a barrel-like or spindle-like shape as a whole.

DESCRIPTION OF THE RELATED ART

An ordinary coil spring is formed by winding a steel filament (hereinafter referred to as the wire) which is constant in diameter over its entire length. In contrast with this, in the case of a coil spring assuming a barrel-like or spindle-like shape, as shown in FIG. 7, it is preferable for the coil spring to have its barrel portion 15 formed by winding a steel filament or wire which is larger in diameter in the barrel portion 15 than in each of its opposite end portions 16. The use of such wire in the barrel portion 15 of the coil spring makes it possible for the coil spring: to obtain more specialized spring properties than those of the ordinary coil spring formed by winding the constant diameter wire over its entire length; and, to reduce its weight as a whole. These are advantages inherent in the coil spring formed by the wire which is not constant in diameter. Due to this, it is preferable for the coil spring to use a so-called "double tapered steel wire", which has its opposite end portions tapered down to their reduced-diameter outer ends.

Heretofore, in manufacturing the coil spring assuming such barrel-like shape: the coil spring is hot formed by winding the wire; and, the thus hot-formed coil spring is then received in a metal heating furnace, wherein the coil spring is sequentially subjected to a series of heat treatments including heating, quenching and tempering processes of the coil spring. In such conventional manufacturing method of the coil spring, though it is necessary to take the coil spring out of its split-type mother pattern which is used to wind the wire thereon to form the coil spring, it is difficult to take the thus formed coil spring out of its mother pattern when the coil spring is hot formed into a barrel-shaped coil spring and cooled to contract relative to its mother pattern, because such contraction of the coil spring tightens the spring's grip on its mother pattern. This is one of disadvantages inherent in the conventional manufacturing method of the barrel-shaped coil spring. The conventional manufacturing method further suffers from another disadvantage that the heat treatments tend to deform the coil spring and also causes the loss of carbon from the surface of the coil spring, which makes it difficult for the coil spring to be continuously heat treated.

Consequently, it is apparent that the need exists for manufacturing of the barrel-shaped coil spring by winding the filament of spring steel wire after the filament has been subjected to continuous heat treatments. Here, in order to produce the spring steel wire free from any defects such as decarbonization and the like, it is preferable for the continuous heat treatments to use induction heating processes and the like.

DISCLOSURE OF THE INVENTION

The problems to be solved by the present invention are as follows: namely,

In case that a steel wire with a constant diameter is heat treated, it is easy to perform a continuous heat treatment of the steel wire by using the induction heating, which is capable of uniformly heating the steel wire. In contrast with this, in case that the double tapered steel wire which has its large-diameter portions and its small-diameter portions arranged in tandem in its longitudinal direction is continuously heat treated using the induction heating, the large-diameter portions of the wire are lower in temperature than the smaller-diameter portions of the same wire, and therefore lower in hardness than the small-diameter portions of the wire after quenching but larger in hardness than the small-diameter portions of the wire after tempering. In any case, this causes the double tapered steel wire to vary in tensile strength over its entire length, which is a disadvantage inherent in the prior art.

In forming the spring steel wire into a coiled shape, it is preferable to use a double tapered steel wire which is uniform both in hardness and in tensile strength over its entire length.

Consequently, it is an object of the present invention to solve the above problems inherent in the prior art by providing a double tapered steel wire and a method and an apparatus for continuously heat treating the wire, wherein the wire is heated to a constant temperature over the entire length thereof, which makes the wire constant in hardness over its entire length.

In accordance with a first aspect of the present invention, the above object of the present invention is accomplished by providing:

A method for continuously heat treating a double tapered steel wire having its constant diameter straight portion disposed between its opposite tapered end portions in its longitudinal direction, wherein the opposite tapered end portions are tapered down to their outer reduced-diameter ends, characterized by comprising the steps of:

continuously detecting a diameter of the steel;

controlling the amount of energy of induction heating supplied to the steel wire, wherein the amount of the energy is proportional to the diameter of the steel wire having been detected;

whereby the steel wire is heated to the same temperature over the entire length thereof and heat treated.

In other words, in contrast with a conventional method in which a conventional coil spring has its large-diameter portion heated at the expense of the same amount of electric power as that required to heat its small-diameter portion, in the method of the first aspect of the present invention for continuously heat treating the double tapered steel wire: a diameter of the steel wire is continuously detected by a wire diameter detection means; when the constant diameter straight portion of the steel wire is heated, the amount of energy supplied to a heating means for continuously heating the steel wire is kept constant; when each of the opposite tapered end portions is heated, the amount of energy supplied to the heating means is controlled so as to be proportional to variations in diameter of the tapered end portion; whereby the steel wire has both its small-diameter portion and its large-diameter portion heated to the same temperature, and heat treated both the small-diameter and the large-diameter portion thereof. Due to such heat treatments of the steel wire, it is possible for the method of the present invention to obtain the heat-treated double tapered steel wire in which its large-diameter straight portion and its small-diameter tapered portion are equal to each other both in hardness and in tensile strength. Incidentally, in any one of a quenching and a tempering heat treatment, it is possible to heat both the large-diameter and the small-diameter portion of the wire to the same temperature.

In other words, in a conventional induction heating process which is not controlled in the same manner as that of the method of the present invention, since a small-diameter portion of a double tapered steel wire is higher in temperature than a large-diameter portion of the same wire, the small-diameter portion is larger in hardness than the large-diameter portion after quenching, but smaller in hardness than the latter after tempering. In contrast with this, in the method of the present invention, since heating temperatures are controlled in proportion to the variable diameter of the double tapered steel wire, it is possible for the double tapered steel wire to have its small-diameter portions be equal in tensile strength to its large-diameter portions. According to a second aspect of the present invention, it is possible to manufacture such double tapered steel wire by providing:

A double tapered steel wire characterized by comprising:

a straight portion with a constant diameter;

opposite tapered portions disposed adjacent opposite ends of the straight portion, wherein the tapered portions are tapered down to their reduced-diameter outer ends;

wherein the steel wire is heat treated using induction heating in a manner such that the steel wire has its small-diameter portions be substantially equal to its large-diameter portion (21) in tensile strength.

According to a third aspect of the present invention, it is possible to manufacture the double tapered steel wire by providing:

An apparatus for continuously heat treating a double tapered steel wire, wherein the steel wire is provided with a constant-diameter straight portion and a pair of opposite tapered portions disposed adjacent to opposite ends of the straight portion, wherein the tapered portions are tapered down to their reduced-diameter outer ends, the apparatus being characterized by comprising:

an induction heating means for continuously heating the steel wire;

a wire diameter detection means for continuously detecting a diameter of the steel wire; and a control means for controlling the amount of energy supplied to the induction heating means in a manner such that the steel wire has its individual portions heated to individual predetermined temperatures over the entire length of the steel wire, wherein the amount of the energy supplied to the induction heating means is proportional to a wire diameter of the steel wire having been detected by the wire diameter detection means.

Preferably, the apparatus of the present invention further comprises a quenching means and a tempering means, wherein the quenching means and the tempering means are arranged in tandem to have the steel wire be continuously subjected to a quenching process and a tempering process in this order.

In the apparatus of the present invention, preferably, the double tapered steel wire is provided with: a plurality of straight portions each with a constant diameter; and, a plurality of tapered portions which are spaced alternately with the straight portions in a longitudinal direction of the double tapered steel wire.

BRIEF DESCRIPTION OF THE DRAWINGS

The above and other objects, advantages and features of the present invention will be more apparent from the following description taken in conjunction with the accompanying drawings in which:

FIG. 8 is the dimensions of the sample steel wires in the FIG. 2, subjected to the example 1.

BEST MODES FOR CARRING OUT THE INVENTION

Figure 1:
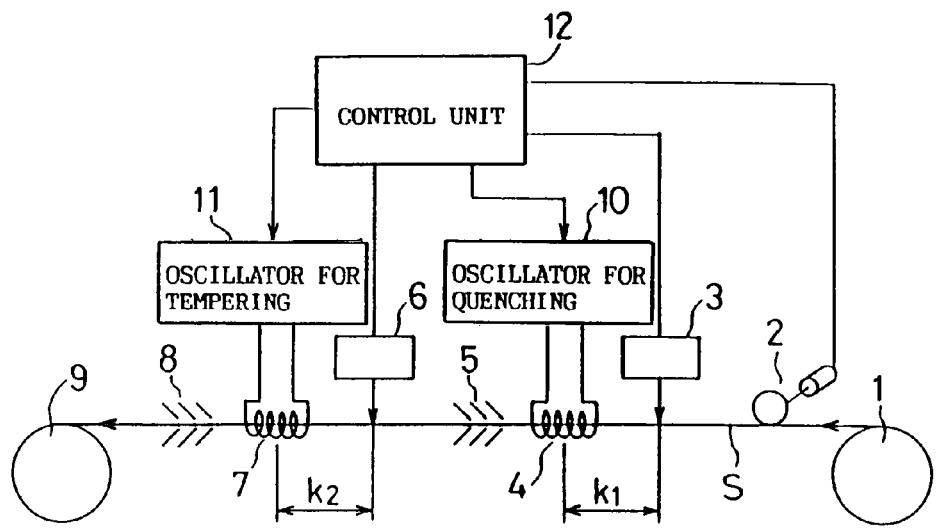
FIG. 1 is a schematic block diagram of the apparatus for continuously heat treating the double tapered steel wire of the present invention, illustrating the construction of the apparatus of the present invention.

The best modes for carrying out the present invention will be described in detail using embodiments of the present invention with reference to the accompanying drawings.

The present invention may, however, be embodied in various different forms and should not be construed as limited to the embodiments set forth herein; rather, these embodiments are provided so that this disclosure will be thorough and complete, and will fully convey the scope of the present invention to those skilled in the art.

In the accompanying drawings, the diameter and the length of a double tapered steel wire are exaggerated for clarity. Like reference numerals refer to like parts throughout the drawings.

Figure 2:
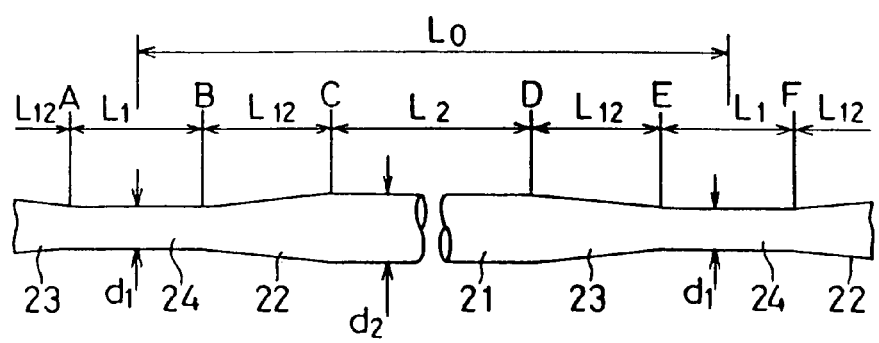
FIG. 2 is a side view of the double tapered steel wire of the present invention, illustrating its outline and dimensions.

FIG. 1 shows in construction an apparatus of the present invention for continuously heat treating a double tapered steel wire 1 of the present invention. FIG. 2 shows an embodiment of the double tapered steel wire 1 of the present invention.

As shown in FIG. 2, the double tapered steel wire 1 hereinafter referred to also as the workpiece S) is provided with: a large-diameter straight portion 21 having a constant diameter and a length of $L_2$ and, a pair of opposite tapered portions 22, 23 each of which is disposed adjacent to each of opposite ends of the straight portion 21, tapered down to its outer reduced-diameter end, and has a length of $L_{12}$ wherein the outer reduced-diameter end of each of the tapered portions 22, 23 is connected with a small-diameter straight portion 24 in a manner such that the large-diameter straight portion 21, tapered portions 22 and 23, and the small-diameter straight portion 24 are integrally connected with each other to form the continuous double tapered steel wire 1 (i.e., workpiece S) of the present invention. When the workpiece S is cut at the midpoint of the small-diameter straight portion 24, it is possible to obtain a piece or a unit length of the workpiece S, wherein the piece or unit length of the workpiece S has a length of $L_0$.

Now, an apparatus of the present invention for continuously heat treating the steel wire or workpiece S will be described in detail.

As shown in FIG. 1, arranged in tandem in the apparatus (from its upstream side (i.e., right-hand side) to its downstream side (i.e., left-hand side) are: a payoff reel stand 1; a length measuring means 2; a first wire-diameter measuring unit 3; a heating coil 4 for use in quenching (hereinafter referred to as the quenching-purpose heating coil 4); a water-cooled jacket 5 for use in quenching (hereinafter referred to as the quenching-purpose water-cooled jacket 5); a second wire-diameter measuring unit 6; a heating coil 7 for used in tempering (hereinafter referred to as the tempering-purpose heating coil 7); a water-cooled jacket 8 for use in tempering (hereinafter referred to as the tempering-purpose water-cooled jacket 8); and, a take-up reel stand 9.

More specifically, the length measuring means 2 is provided with a roller (shown in FIG. 1) which is brought into contact with a surface of the double tapered steel wire or workpiece S being heat treated, and rotatably driven by the workpiece S when the workpiece S travels through the apparatus of the present invention. Consequently, in the length measuring means 2, a length of the workpiece S being treated is calculated based on the rate of such rotation of the roller.

On the other hand, each of the first wire-diameter measuring unit 3 and the second wire-diameter measuring unit 6 is a non-contact measuring unit for continuously measuring a wire diameter of the workpiece S, for example such as a laser wire-diameter measuring unit and the like. The first wire-diameter measuring unit 3 and the second wire-diameter measuring unit 6 are spaced apart from each other, and disposed in the upstream side or inlet side of a center of the quenching-purpose heating coil 4 and in the upstream side or inlet side of a center of the tempering-purpose heating coil 7 by distances $K_1$ and $K_2$ respectively.

The quenching-purpose heating coil 4 and the tempering-purpose heating coil 7 are electrically connected with a high-frequency oscillator 10 for use in quenching (hereinafter referred to as the quenching-purpose high-frequency oscillator 10) and a high-frequency oscillator 11 for use in tempering (hereinafter referred to as the tempering-purpose high-frequency oscillator 11), respectively. On the other hand, the quenching-purpose water-cooled jacket 5 and the tempering-purpose water-cooled jacket 8 function to quench the workpiece S heated by the quenching-purpose heating coil 4 and the tempering-purpose heating coil 7, respectively.

In the control means or unit 12, as will be described later, the amount of electric power supplied to each of the quenching-purpose heating coil 4 and the tempering-purpose heating coil 7 from the corresponding quenching-purpose high-frequency electric power source 10 and the corresponding tempering-purpose high-frequency electric power source 11, respectively, is controlled based on signals issued from each of the length measuring means or unit 2, first wire-diameter measuring unit 3 and the second wire-diameter measuring unit 6.

Hereinbelow, the heat treatment apparatus having the above construction will be described in operation. In the apparatus, the workpiece S to be heat treated is unwound and supplied from the payoff reel stand 1, heated to its quenching temperature by the quenching-purpose heating coil 4, and then quenched by the quenching-purpose water-cooled jacket 5. The thus quenched workpiece S is subsequently heated to its tempering temperature by the tempering-purpose heating coil 7 and then tempered. After that, the thus tempered workpiece S is cooled in the tempering-purpose water-cooled jacket 8, and then taken up in the take-up reel stand 9, which makes it possible to continuously quench and temper the workpiece S.

More specifically, before the workpiece S is introduced into the quenching-purpose heating coil 7, a traveled distance of the workpiece S is measured by the length measuring unit 2 and the wire diameter of the workpiece S thus measured in its traveled distance is measured by the first wire-diameter measuring unit 3. On the other hand, the control unit 12 is so designed as to supply electric power to the quenching-purpose heating coil 4 in a manner such that the amount of electric power supplied to the heating coil 4 is proportional to the dimension of workpiece's wire diameter having been measured by the first wire-diameter measuring unit 3. More specifically, the control unit 12 controls the quenching-purpose high-frequency oscillator 10 in a manner such that the amount of electric power supplied from the high-frequency oscillator 10 to the heating coil 4 is proportional to the square of the wire diameter's value of the workpiece S. In this embodiment, the traveled distance of the workpiece S is measured by the length measuring unit 2. Under such circumstances, when the workpiece S which has its own position measured by the first wire-diameter measuring unit 3 reaches a central portion of the quenching-purpose heating coil 4 after the workpiece S travels a distance of $K_1$, the quenching-purpose high-frequency oscillator 10 is controlled by the control unit 12 so as to supply a predetermined amount of electric power to the quenching-purpose heating coil 4.

For example, an amount $P_1$ of electric power is supplied from the quenching-purpose high-frequency oscillator 10 to the quenching-purpose heating coil 4 when a workpiece's small-diameter portion "A" having a diameter $d_1$ (shown in FIG. 2) moves by the above distance of $K_1$ to reach the central position of the quenching-purpose heating coil 4. Due to this, the workpiece S is continuously heated by the quenching-purpose heating coil 4 at the expense of the amount $P_1$ of electric power until the small-diameter portion "A" of the workpiece S reaches an apparatus'-side position "B" (shown in FIG. 2). At this time, a distance ($L_1$) traveled by the workpiece S is measured by the length measuring unit 2.

When the workpiece S moves so that a workpiece's-side position "B" reaches the central portion of the quenching-purpose heating coil 4, electric power supplied to the quenching-purpose heating coil 4 is gradually increased as a wire diameter of the workpiece S gradually increases between the workpiece's small-diameter portion "B" having a diameter $d_1$ and a workpiece's large-diameter portion "C" having a diameter $d_2$, i.e., increases in an area of a workpiece's tapered portion "B–C". At this time, the amount of electric power supplied to the quenching-purpose heating coil 4 varies in proportion to the square of the wire diameter's value in the tapered portion of the workpiece S. After that, when the workpiece's large-diameter portion "C" having the diameter $d_2$ reaches the central portion of the quenching-purpose heating coil 4, the amount of electric power supplied to the quenching-purpose heating coil 4 reaches the following value of $P_2$: namely, $P_2 = P_1 \times (d_2/d_1)^2$ In other words, the workpiece S is constantly heated at the expense of the amount $P_2$ of electric power between the workpiece's large-diameter portions "C" and "D" each of which has a diameter $d_2$ (i.e., heated in an area of a workpiece's tapered portion "C–D").

After that, the workpiece S further travels to have its tapered portion "D–E" reach the central portion of the quenching-purpose heating coil 4. Then, electric power supplied to the quenching-purpose heating coil 4 is gradually decreased as a wire diameter of the workpiece S gradually decreases between the workpiece's large-diameter portion "D" having a diameter $d_2$ and a workpiece's small-diameter portion "E" having a diameter $d_1$ (i.e., between a workpiece's tapered portion "D–E"). As a result, the amount of electric power supplied to the quenching-purpose heating coil 4 reaches a value of $P_1$ at the workpiece's small-diameter portion "E". As described above, heating of the workpiece S is performed by varying the amount of electric power supplied to the quenching-purpose heating coil 4 in proportion to the wire diameter of the workpiece S in a manner such that both the large-diameter and the small-diameter portion of the workpiece S are heated to the same temperature. The above-mentioned control in heating is realized by the control unit 12.

The workpiece S having been heated by the quenching-purpose heating coil 4 is then quenched in the quenching-purpose water-cooled jacket 5. Since the workpiece S is heated to a constant temperature over its entire length, it is possible for the workpiece S to have both its large-diameter portion and its small-diameter portion quenched at the same cooling rate, which makes it possible for the workpiece S to obtain a constant hardness over its entire length including its large-diameter portion and its small-diameter portion.

After that, the workpiece S having been quenched is successively heated to its tempering temperature by the tempering-purpose heating coil 7, and then tempered. In this tempering operation, the wire diameter of the workpiece S is measured by the second wire-diameter measuring unit 6 as is in the quenching operation. More specifically, when the workpiece S to be tempered reaches a central portion of the tempering-purpose heating coil 7, a predetermined amount of electric power proportional to the square of the wire diameter's value of the workpiece S is supplied to the tempering-purpose heating coil 7, so that the workpiece S is uniformly heated over its entire length as is in the case of the previous quenching process. The workpiece S thus uniformly heated is then cooled in the tempering-purpose water-cooled jacket 8. After completion of such cooling process, the workpiece S is taken up in the take-op reel stand 9, whereby all the heat treatments of the workpiece S are completed.

The present invention is further illustrated by the following examples:

EXAMPLE 1

Sample steel wires (i.e., sample workpieces) were subjected to quenching processes. Each of the sample steel wire assumed the same shape as that of the workpiece S shown in FIG. 2. The dimensions of each of the sample steel wires are shown in FIG. 8.

One of the sample steel wires was subjected to a quenching process performed according to the method of the present invention in which the control unit 12 was used, while the other of the sample steel wires was subjected to a quenching process performed according to the conventional method in which no control means was used. All the sample steel wires were tested under the following common conditions for comparison purposes:

Line speed: 80 mm/sec
Length of the quenching-purpose heating coil 4: 340 mm
Frequency: 32 KHz
Target temperature in heating: 910° C.

Figure 3:
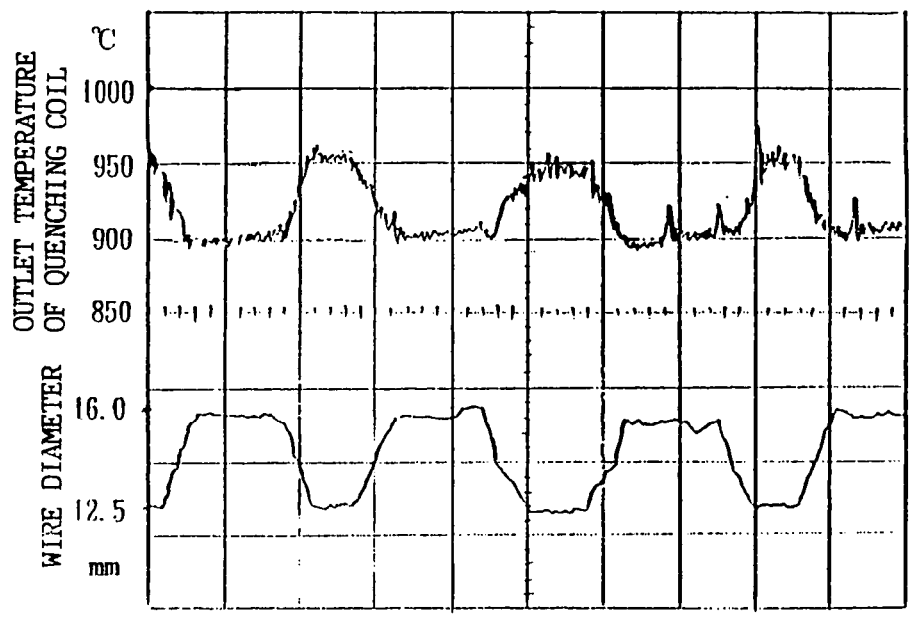
FIG. 3 is a graph of the prior art, illustrating the quenching temperature of the double tapered steel wire subjected to the conventional method.
Figure 4:
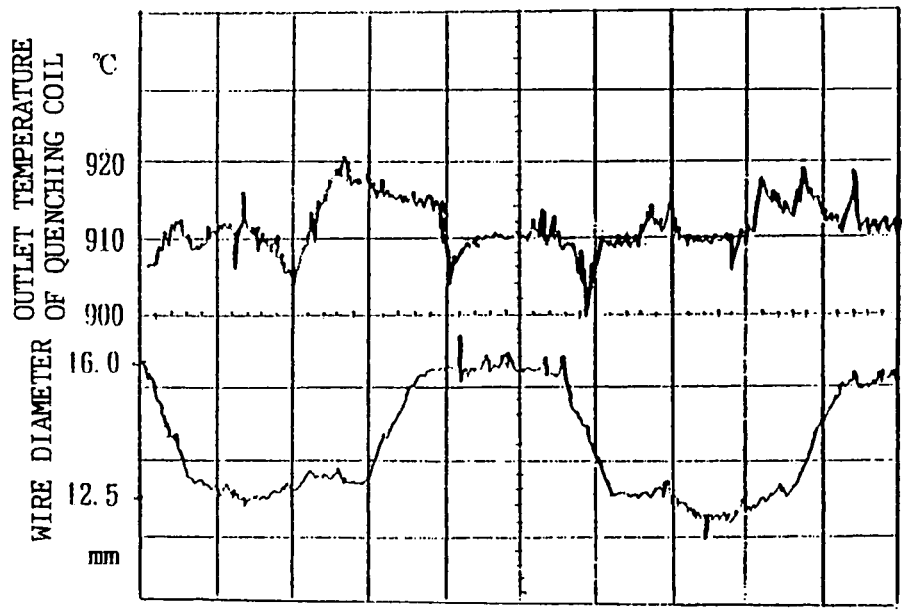
FIG. 4 is a graph of the present invention, illustrating the quenching temperature of the double tapered steel wire of the present invention subjected to the method of the present invention.

Shown in FIGS. 3 and 4 are: the quenching temperature of the sample steel wire subjected to the conventional method, and the corresponding quenching temperature of the sample steel wire subjected to the method of the present invention, respectively. These quenching temperatures were measured in the Example 1. Further shown in FIGS. 3 and 4 are: coil outlet temperatures measured at an outlet opening of the quenching-purpose heating coil 4 in the Example 1; and, wire diameters of the sample steel wires measured in the Example 1.

As is clear from these drawings, in the conventional method the results of which are shown in FIG. 3, the sample steel wire has its large-diameter portion be lower in temperature than its small-diameter portion. As for the tapered portion of the sample steel wire, the temperature of such tapered portion decreases as the wire diameter of the sample steel wire increases. Due to this, a difference in temperature between the large-diameter portion and the small-diameter portion of the sample steel wire treated according to the conventional method reached approximately 70° C.

In contrast with this, in the sample steel wire treated according to the method of the present invention, a difference in temperature between the large-diameter portion and the small-diameter portion of the sample steel wire was approximately 20° C. Further, the tapered portion of the sample steel wire was substantially free from any difference in temperature over its entire length in the heating process.

EXAMPLE 2

Sample steel wires (i.e., sample workpieces) were subjected to tempering processes. Each of the sample steel wires assumed the same shape as that of the workpiece S shown in FIG. 2. The dimensions of each of the sample steel wires are shown in the above Table 1.

One of the sample steel wires was subjected to a tempering process performed according to the method of the present invention in which the control unit 12 was used, while the other of the sample steel wires was subjected to a tempering process performed according to the conventional method in which no control means was used. All the sample steel wires were tested under the following common conditions for comparison purposes:

Line speed: 80 mm/sec
Length of the tempering-purpose heating coil 7: 340 mm
Frequency: 7.5 KHz
Target temperature in heating: 450° C.

Figure 5:
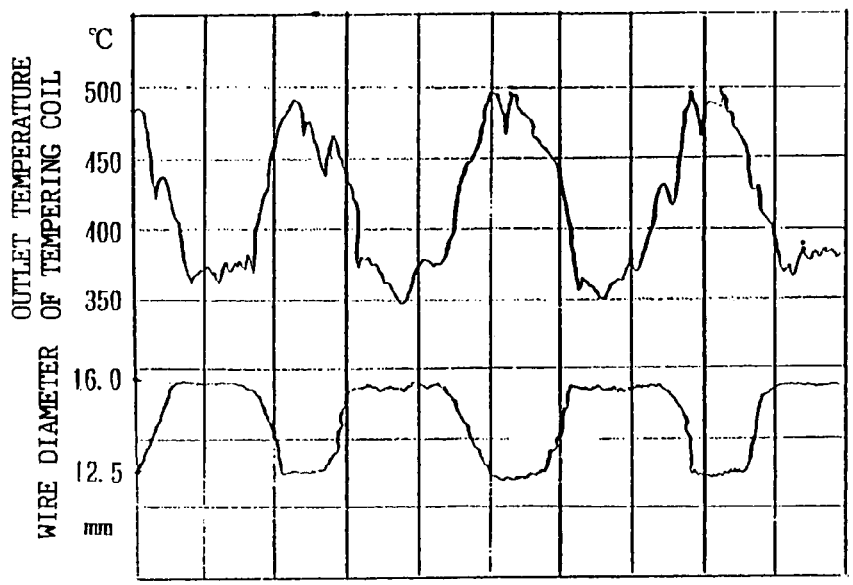
FIG. 5 is a graph of the prior art, illustrating the tempering temperature of the double tapered steel wire subjected to the conventional method.
Figure 6:
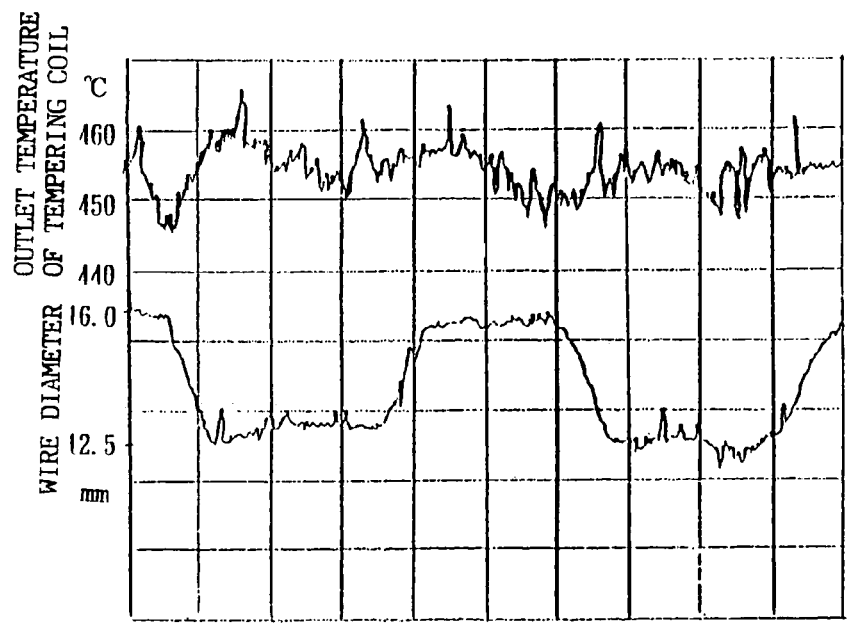
FIG. 6 is a graph of the present invention, illustrating the tempering temperature of the double tapered steel wire of the present invention subjected to the method of the present invention.
Figure 7:
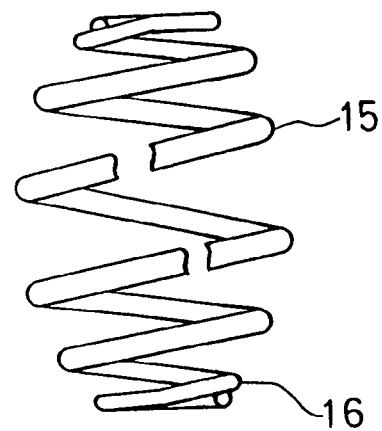
FIG. 7 is a side view of the spindle-like coil spring formed by winding the double tapered steel wire of the present invention.

Shown in FIGS. 5 and 6 are: the tempering temperature of the sample steel wire subjected to the conventional method, and the corresponding tempering temperature of the sample steel wire subjected to the method of the present invention, respectively. These tempering temperatures were measured in the Example 2. Further shown in FIGS. 5 and 6 are: coil outlet temperatures measured at an outlet opening of the tempering-purpose heating coil 7 in the Example 2; and, wire diameters of the sample steel wires measured in the Example 2.

As is clear from these drawings, in the conventional method the results of which are shown in FIG. 5, the sample steel wire has its large-diameter portion be lower in temperature than its small-diameter portion in the tempering processes, as is in the quenching processes described above. As for the tapered portion of the sample steel wire, the temperature of such tapered portion decreases as the wire diameter of the sample steel wire increases. Due to this, a difference in temperature between the large-diameter portion and the small-diameter portion of the sample steel wire treated according to the conventional method reaches approximately 150° C. In contrast with this, in the sample steel wire treated according to the method of the present invention, a difference in temperature between the large-diameter portion and the small-diameter portion of the sample steel wire- was approximately 20° C. Further, the tapered portion of the sample steel wire was substantially free from any difference an temperature over its entire length in the heating process.

Further, in the above embodiments, the double tapered steel wire S has been described so as to be constructed of a plurality of the straight portions and the tapered portions, wherein the straight portions are spaced alternately with the tapered portions and integrated therewith to form the double tapered steel wire S of the present invention. However, it is also possible for the present invention to have a double tapered steel wire which is constructed of: a single straight portion; and, a pair of tapered portions each of which is disposed adjacent to each of opposite axial end portions of the straight portion.

INDUSTRIAL APPLICABILITY

It is possible to mass produce a piece of the steel wire at low cost in an easy manner by simply cutting these pieces out of the steel wire, wherein the steel wire's piece consists of: a single straight portion; and, a pair of the opposite tapered portions which are disposed adjacent to opposite ends of such a single straight portion and tapered down to their outer reduced-diameter ends. These are advantages inherent in the method and the apparatus of the present invention.

Due to this, the double tapered steel wire of the present invention is capable of having its small-diameter portions, its tapered portions and its large-diameter portions heat treated in a manner such that each of these portions has both a constant hardness and a constant tensile strength. Consequently, the present invention having the above construction is capable of manufacturing the barrel-shaped or spindle-shaped coil spring at considerably reduced cost in an easy manner, which makes it possible to have the steel wire of the present invention widely used in any other application fields in addition to the field of spring steel wire.

What is claimed is:

1. A method for continuously heat treating a double tapered steel wire (S), characterized by comprising the steps of:
    continuously detecting a diameter of said steel wire (S) in heat treatment of said steel wire (S), wherein said steel wire (S) has a constant large-diameter portion (21), a constant small-diameter portion (24) and a tapered end portions (22, 23) disposed therebetween in its longitudinal direction;
    controlling the amount of energy of induction heating supplied to said steel wire (S), wherein the amount of said energy is proportional to a wire diameter of said steel wire (S) having been detected so that said steel wire (S) is evenly heated over the entire length of said steel wire (S); and
    at least one of quenching and tempering said steel wire (S) in a manner such that the tensile strength of the small-diameter portion and the tensile strength of the large-diameter portion of said steel wire (S) are substantially equal;
    wherein said steel wire (S) substantially keeps its original shape unchanged throughout in its heat treatment.

2. A double tapered steel wire (S) characterized by comprising:
    a straight portion (21) with a constant large-diameter;
    opposite tapered portions (22, 23) disposed adjacent to opposite ends of said straight portions (21, 24), wherein said tapered portions (22, 23) are tapered down to their reduced-diameter outer ends;
    straight portions (24) with a constant small-diameter respectively disposed on opposite ends of said tapered portions;
    wherein a diameter of said steel wire (S) is continuously detected, and the amount of energy of induction heating supplied to said steel wire (S) thus detected is proportional to said diameter of said steel wire (S), so that said steel wire (S) is evenly heated over the entire length of said steel wire (S), and then at least one of quenched and tempered in a manner such that the tensile strength of the small-diameter portions (24) is substantially equal to the tensile strength of the large-diameter portion (21);
    wherein said steel wire (S) substantially keeps its original shape unchanged throughout its heat treatment.

* * * * *